United States Patent
Merrick et al.

(12)

(10) Patent No.: US 6,339,841 B1
(45) Date of Patent: Jan. 15, 2002

(54) CLASS LOADING MODEL

(75) Inventors: Roland Albert Merrick, Harvington; Alan Michael Webb, Chandlers Ford, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/293,825

(22) Filed: Apr. 16, 1999

(30) Foreign Application Priority Data

Oct. 19, 1998 (GB) .............................. 9822832

(51) Int. Cl.⁷ .............................. G06F 9/445
(52) U.S. Cl. .................. 717/10; 717/11; 707/103 R; 709/203
(58) Field of Search .................. 717/5, 4, 10, 11; 707/10, 1, 103 R, 103 Y, 104, 103 Z; 709/101, 206, 332, 328, 1, 203, 236; 713/2

(56) References Cited

U.S. PATENT DOCUMENTS

| | | | | |
|---|---|---|---|---|
| 5,303,380 A | * | 4/1994 | Tenny et al. | 717/10 |
| 5,619,710 A | * | 4/1997 | Travis, Jr. et al. | 709/203 |
| 5,815,718 A | * | 9/1998 | Tock | 717/5 |
| 5,966,542 A | * | 10/1999 | Tock | 717/11 |
| 5,966,702 A | * | 10/1999 | Fresko et al. | 707/1 |
| 5,974,428 A | * | 10/1999 | Gerard et al. | 707/203 |
| 6,016,392 A | * | 1/2000 | Jordan | 709/328 |
| 6,026,237 A | * | 2/2000 | Berry et al. | 717/4 |
| 6,061,520 A | * | 5/2000 | Yellin et al. | 717/5 |
| 6,085,198 A | * | 7/2000 | Skinner et al. | 707/103 |
| 6,092,120 A | * | 7/2000 | Swaminathan et al. | 709/247 |

FOREIGN PATENT DOCUMENTS

EP 0777177 6/1997 ............. G06F/9/44

OTHER PUBLICATIONS

IBM Technical Disclosure Bulletin, "Java Dynamic Class Loader," vol. 39, Issue No. 11, pp. 107–108, Nov. 1, 1996.*

Jensen et al., "Security and Dynamic Class Loading in Java: A formalisation," IEEE Proceedings of 1998 International Conference on Computer Languages, May 14–16, 1998, pp. 4–15.*

Liang et al., "Dynamic Class Loading in the Java virtual Machnie," ACM Proceedings of the conf. on object–oriented programming, systems, languages, and applications, Oct. 18–22, 1998, pp. 36–44.*

* cited by examiner

Primary Examiner—Tuan Q. Dam
(74) Attorney, Agent, or Firm—Casey P. August

(57) ABSTRACT

This invention relates to a method of loading Java ClassFiles on to a Java Virtual Machine. On a regular JVM the ClassFile are loaded as and when required. In this specification there is described a method of implementing an object oriented program language such as Java on a computer. The method comprises identifying a class, one of the basic building blocks of the language, which is not within the program domain, that is not loaded into the Java a Virtual Machine. Next it introduces to the program domain only the minimum components of the class which are necessary for commencing processing of the class. The class may comprise several blocks of data representing the methods of the class, since the class may only have been identified because one of the methods within the class was referenced then only the block of data representing this method is loaded into the Java Virtual Machine along with the other essential components of the class. Other blocks of data representing methods can be loaded as and when required by the programming domain. Redundant method components may be removed from the program domain to save memory.

22 Claims, 4 Drawing Sheets

CLASS LOADING MODEL

FIELD OF INVENTION

This invention relates to a class loading model for an object orientated programming language.

BACKGROUND

The size and price of memory chips has decreased steadily since the advent of computers and as a consequence the storage capacity on a machine has increased considerably over time. Ten years ago 64 k bytes of RAM was the norm, now it is 64 M bytes and in the next ten years it will possibly be 64 G bytes. This increase in RAM memory storage on a computer has been followed if not lead by an increase on the demands on storage by larger memory intensive software applications. One solution introduced by some operating systems to reduce the RAM memory required is to use dynamic linking of class libraries, that is to only load libraries of classes when they are needed by an application. This allows the available RAM to be used more efficiently. One problem with loading whole sets of classes is that more classes are loaded than are actually used and time is wasted loading the unused classes.

Dynamic loading of individual classes is part of a Java enabled environment whereby a small application or applet is dynamically sent from server to client on request. The applet comprises a number of Java classes needed for the execution of the applet and a set of classes may be loaded in a container called a Jar or an individual class may be loaded. In this way the Java environment saves memory by only loading the classes it needs to run the application or applet. Time is also saved as only the classes that are needed are loaded. However, speed of operation of the Java environment is critical and a major drawback of using the Java language.

SUMMARY OF THE INVENTION

According to one aspect of the invention there is provided a method of processing a class file on a computer system comprising: identifying independent parts within the class; creating separate components for each separable part of the class; and storing the components so that each component of the class is individually identifiable and accessible.

In this way the granularity of loading is increased within the classes with only the components needed within the class being loaded and used. This leads to an increased speed of operation and a reduction in the memory needed.

The separable parts of the class identified are the class meta data part and the methods part. Although the ClassFile is a serialised sequence of byte code, the meta data part and method byte code parts are contiguous and not combined allowing separation and extraction from the ClassFile.

In the case where a method requires other methods in the class for its operation, the metadata component contains information indicating which methods are dependent and should be loaded together. This allows the method loader to be more efficient in the loading of the individual methods whereas, if each method was loaded only when referenced, the speed of operation of the system would be reduced.

According to another aspect of the invention there is provided a method implementing an object oriented program language on a computer comprising: identifying a class which is not within the program domain; and introducing to the program domain only the minimum components of the class which are necessary for commencing processing of the class. The program domain is the environment in which the program runs and in this embodiment it is a Java Virtual Machine "JVM". The object oriented language is the Java programming language which is loaded into the JVM as classes and is processed by interpreting the bytes codes.

Advantageously the method further comprises identifying a separable meta data component and separable method components of the class and introducing the meta data component and only the minimum number of method components to the program domain. The meta data component may itself be separated into further components to further increase the level of granularity.

Furthermore, the method further comprising setting a field in the program domain to indicate that method byte code for that method has not been downloaded to the client. This field points at a mechanism for loading the component of method byte code.

Classes are packaged into ClassFiles for distribution and contain components of execution code called methods that may or may not be used during the execution of a program. Due to the over supply of methods such classes are bulky in terms of byte code; this is a major factor in the transfer time from the server to the client. Due to the number of applet transfers that take place over the Internet at present and the expanding number of Java applications envisaged in the future it would be desirable to reduce the transfer time for Java applications and applets.

Use of skeletal Java classes is known in the design of remote applications. However this skeletal class contains only basic metadata including visual information and other data needed for designing an applet. No method data is included in this skeletal class as the skeletal class is not intended to be executed.

The class metadata comprises a class description component, a method table and a constant pool.

Despite Java's compact representation, the classes distributed are often numerous and large. Much of the bulk of a class is made up of the methods themselves. Often, many of the methods downloaded are never used on any given occasion. This invention proposes the distribution of class data at a method level of granularity. This results in the following scenario:

1) A client program requires the use of a remote class
2) A skeleton definition of the class is sent to the client. State metadata and constant pool information is downloaded at this point together with any method identified as always needing to be downloaded.
3) When a method is actually referenced, lazy verification also triggers the downloading of that fragment of the class file. Only those methods actually referenced are transferred.

As a result of this invention the following is achieved: reduced network stress as a result of the reduced data flows; reduced base memory requirements of the Java application; improved client performance as a result of the above; and improved client performance as a result of a more incremental download.

The Java class loader is modified so that only the minimum amount of class metadata is downloaded initially. The existing method reference opcode are modified so that the method code is downloaded at the time of first reference. Once the method is downloaded, the opcode is replaced with its 'quick' counterpart. If the method was previously downloaded by another reference, subsequent references are resolved using the existing mechanisms.

The application proposes that the classes should be loaded without their methods. The methods represent most of the bulk of the class and are often never referenced.

The lazy verification is extended to cause the downloading of individual methods as they are referenced.

Components of the class which are no longer used by the application may be discarded to free up the memory space, this is similar to garbage collection of unused classes but on a finer granular scale. One extreme way to discard unused components would be to discard all the methods not active on the Java stack, if the individual components were needed later they could be reloaded with ease.

DETAILED DESCRIPTION OF PREFERRED EMBODIMENTS

Figure 1:
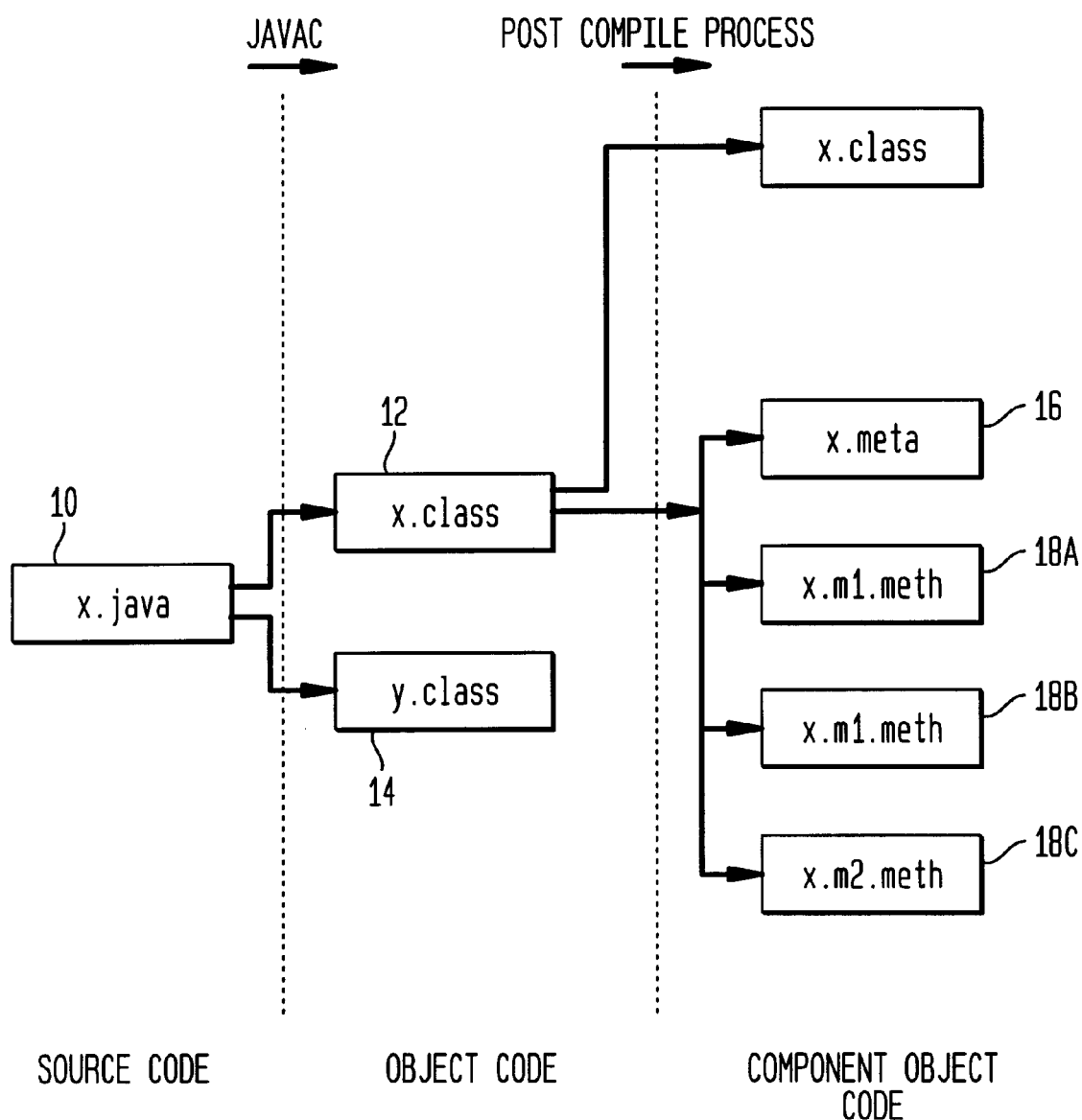
FIG. 1 is a representation of the transformation of a Java application after Java compilation and after processing by a method of the embodiment.

Referring to FIG. 1 there is represented a Java source code applet x.java 10. Such source code is typically written using an editor and then compiled using a Java compiler or Javac to the object code or byte code. The byte code is represented as x.class 12 and y.class 14 in FIG. 1. The classes are self contained pieces of program code comprising metadata and methods for each class. Due to the nature of the class structure, a class may be copied and transferred only as a whole. A post compilation process is applied to the classes in order to break down the self contained structure of the classes and convert a self contained class into individually accessible components of a class. These components may be copied and distributed individually and not as a collection. In this embodiment the class is broken down into a metadata component 16 (x.meta) and individual method components x.m1.method 18A, x.m2.method 18B and x.mn.method 18C etc. The original ClassFile is also stored so that it may be loaded if needed instead of the components.

Each individual accessible component is a part of the class that is separable. In this embodiment the example for separable components are the metadata within the class and the individual methods. However it is feasible that other separable parts of the class may be made individually accessible, for instance parts of the constant pool may be formed into individually accessible parts. Other ways of breaking down a class file are possible, for instance one could group some methods together if they were dependent on one another. This could be indicated in the class metadata where the 'compulsory methods' for downloading were referenced. The classloader would check for 'compulsory methods' in the metadata when the class was first loaded and load those methods referenced.

Figure 2:
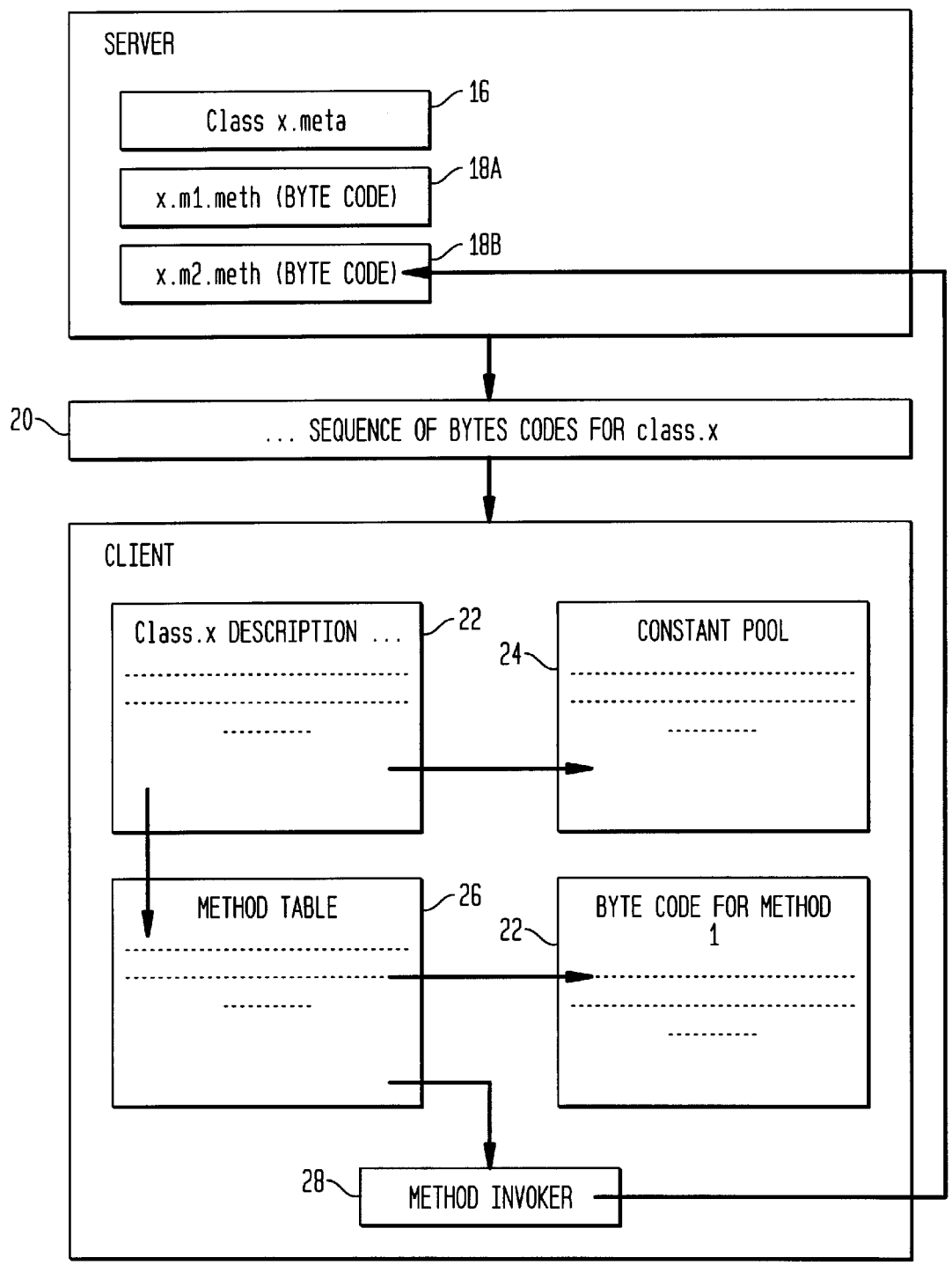
FIG. 2 is a representation of the relationship between the byte code of the class sent over the network, the class as it exists in the client after loading from the server and class as it exists on the server.

As part of the normal ClassLoading operation, a class is sent over a network in its entirety as a linear sequence of bytes codes 20 forming a ClassFile. During class loading the client receives the linear sequence of bytes codes 20 and reconstructs the class structure. This structure is similar to what is seen in FIG. 2 showing the class metadata and methods. From the class metadata 16 is constructed a class description table 22, a constant pool 24 and a method table 26. The class methods are represented by the byte code for method 1 and method 2. The difference between typical class loading and the class loading of the embodiment is that the byte code for all the methods is not necessarily loaded. In FIG. 2 the byte code of method 2 is not loaded and the method 2 pointer in the method table points to a method invoker 28.

The class description component comprises links for the constant pool and the method table. The constant pool defines constants used by the class. The method table comprises the names of the methods used by the class and links to the methods or method invokers for that method. A method invoker is a routine for dealing with a type of method, for instance a byte code method would have a method invoker for starting the JVM interpreting the byte code method. A compiled method would have a JIT method invoker to execute the compiled code. A method that was not initially loaded as part of the minimum class requirement would have a method table pointer to a method loading invoker routine. When the method is needed, a lookup on the method table would lead to a method loader call to load the method. The present embodiment uses a load method invoker (modified class loader) to retrieve the method component that has not been loaded onto the client. The modified class loader can then search for the location of the method component in a method component directory or, as indicated in FIG. 2, find the location in the method invoker itself.

Figure 3:
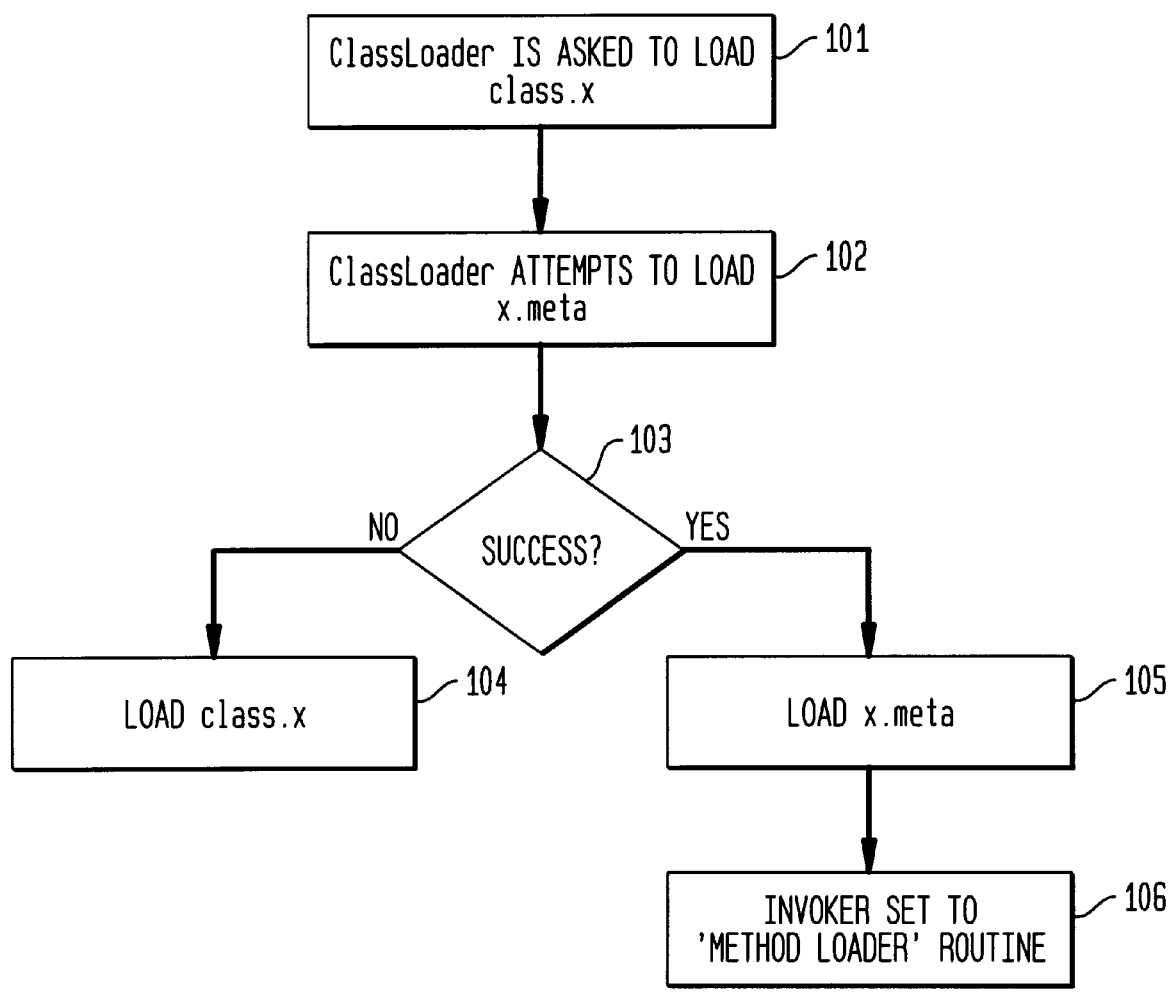
FIG. 3 shows steps taken in loading a class file or a skeletal class file.
Figure 4:
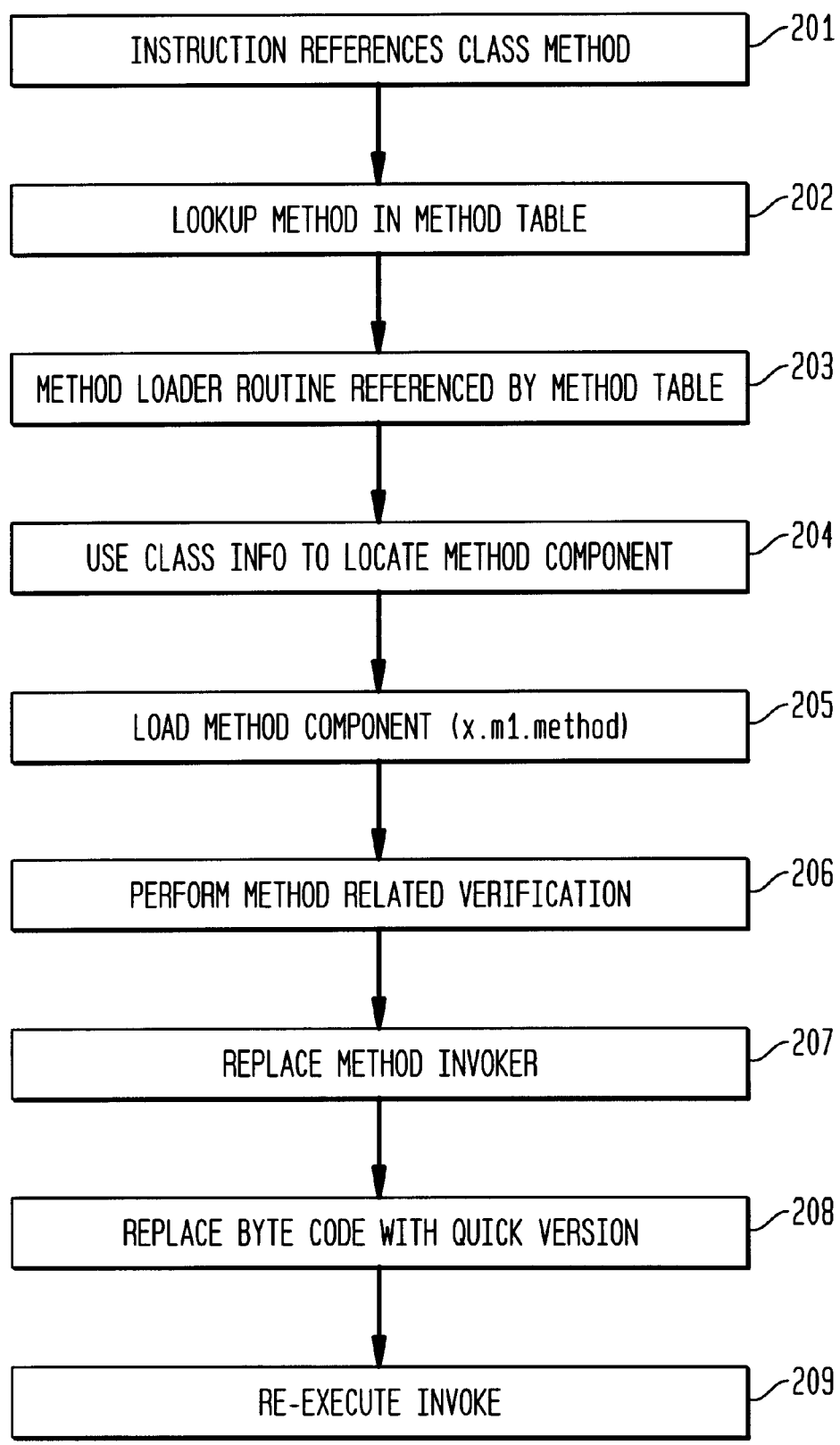
FIG. 4 shows the process of loading a method for interpretation used by the present invention.

When an applet is downloaded from a server to the client by the modified class loader the process is as follows (see FIG. 3). Initially a user or another application will instigate the downloading of an applet, the applet will comprise a number of classes and the modified class loader will be asked to load x.class (step 1). Instead of downloading the x.class in its entirety, the modified class loader assumes that the class has been componentised by the post compilation process and attempts to download the x.meta component of the class (step 102). If this is not successful the modified class loader then loads the x.class in its entirety just as a typical class loader (step 104). If this is successful the x.meta component 16 is loaded into the client and the description component 22, constant pool 24, method table 26 and invoker components 28 set up (step 10) as in FIG. 2. The modified class loader then sets the non-loaded method pointers in the method table to point at a method loader invoker 28 so that a non-loaded method is loaded immediately when it is referenced. This is the quick method load and is normally instigated by an instruction which references a class method. Referring now to FIG. 4, a 'non-quick' method load operates as follows.

A Java applet is being interpreted by the JVM and an instruction references a class method (step 201). This method is looked up in the method table of the class (step 202), the class file or at least the class metadata having already been downloaded from the server. The method table identifies the method loader routine is to be used (step 203). The method loader routine looks up the location of the method component from the class description (step 204) and downloads the component from the server to the client (step 205). Next the method component goes through the normal verification process as it would have done if the class file had been loaded in its entirety (step 206). The method invoker can now be set to point at the location of the byte code method in the client rather than the method loader routine (step 207). The method byte code is written to the location pointed at by the invoker (step 208). Next time the method is referenced the JVM will know that a quick method load can be made. The method load next re-executes the invoke method routine and the JVM interprets the method as per normal (step 209).

In summary there is described a method relating to the loading of Java ClassFiles on to a Java Virtual Machine. On a regular JVM ClassFiles are loaded as and when required. In this specification there is described a method of implementing an object oriented program language such as Java on a computer. The method comprises identifying a class, one of the basic building blocks of the language, which is not within the program domain, that is not loaded into the Java Virtual Machine. Next it introduces to the program domain only the minimum components of the class which are necessary for commencing processing of the class. The class may comprise several blocks of data representing the methods of the class, since the class may only have been identified because one of the methods within the class was referenced then only the block of data representing this method is loaded into the Java Virtual Machine along with the other essential components of the class. Other blocks of data representing methods can be loaded as and when required by the programming domain. Redundant method components may be removed from the program domain to save memory.

What is claimed is:

1. A method of processing a class file on a computer system, said computer system having a server and a runtime domain, said method comprising the steps of:

identifying independent class metadata from a class and independent methods within the class;

creating separate components for each of the class metadata and methods;

storing the class metadata component and the method components in the server, so that each component of the class is individually identifiable and accessible;

sending the class metadata component without the method components from the server to the runtime domain upon receiving a request to load a class from the runtime domain; and sending a specific method component without the class metadata component and without any other method component from the server to the runtime domain upon receiving a request to load a specific method component from the runtime domain.

2. A method as claimed in claim 1 wherein the class metadata component contains information indicating which method components are dependent and should be loaded together.

3. A method as claimed in claim 1 wherein the processing is performed on a Java byte code ClassFile.

4. A method as claimed in claim 1 further comprising the step of discarding independent method components which are no longer in use to free up space in executable memory associated with the computer system.

5. A method as claimed in claim 4 further comprising the step of setting a method invoker pointer for an independent method component to point at a method loader routine.

6. A method as claimed in claim 5 further comprising the step of changing the method invoker pointer for the independent method to point at a location of an actual independent method component after the method component has been moved to the runtime domain.

7. A method of implementing an object oriented program language on a computer system, said computer system having a server and a runtime domain, said method comprising the steps of:

identifying a class which is not within the runtime domain but in a server;

identifying an independent class metadata component and independent method components of the class and introducing the class metadata component and only a required number of independent method components to the runtime domain from the server; and introducing an additional independent method component into the runtime domain from the server when the additional method component is required and is not in the runtime domain.

8. A method as claimed in claim 7 further comprising the step of setting a field in the runtime domain to indicate that a method byte code for a particular method has not been downloaded to a client.

9. A method as claimed in claim 8 wherein the field points at a mechanism for loading a component of the method byte code.

10. A method as claimed in claim 7 further comprising the step of setting a method invoker pointer for an independent method component to point at a method loader routine.

11. A method as claimed in claim 10 further comprising the step of changing the method invoker pointer for the independent method to point at a location of an actual independent method component after it has been moved to the runtime domain.

12. A computer system for processing a class file comprising:

a server and a runtime domain;

means for identifying independent class metadata from the class file and independent methods within the class file;

means for creating separate components for each of the class metadata and methods;

means for storing the class metadata component and the method components, in the server, so that each component of the class file is individually identifiable and accessible;

means for, on receiving a request to load a class file from the runtime domain, sending the class metadata component without the method components from the server to the runtime domain; and means for, on receiving a request to load a specific method component from the runtime domain, sending that component without the class metadata and without any other method component from the server to the runtime domain.

13. The system as recited in claim 12 wherein the class metadata component contains information indicating which methods are dependent and should be loaded together.

14. The system as recited to claim 12 wherein the processing is performed on a Java byte code ClassFile.

15. The system as recited in claim 12 further comprising:

means for discarding method components which are no longer used, to free up memory space in the executable memory.

16. The system as recited in to claim 12 further comprising:

means for setting a method invoker pointer for a method component to point at a method loader routine.

17. The system as recited in claim 16 further comprising:

means for changing the method invoker pointer for the method component to point at a location of an actual method component after the method invoker pointer has been moved to the runtime domain.

18. A computer system for implementing an object oriented program language, said computer system comprising:

a server and a runtime domain;

means for identifying a class which is not within a program domain but in the server;

means for identifying an independent class metadata component and independent method components of the class and introducing the class metadata component and only the minimum number of method components to the runtime domain from the server; and means for, when a method component is required and is not in the runtime domain, introducing the method component into the runtime domain from the server.

19. The system as recited in claim 18 further comprising:

means for setting a field in the program domain to indicate that method byte code for that method has not been downloaded to the client.

20. The system as recited in claim 18 wherein the field points at a mechanism for loading the component of method byte code.

21. The system as recited in claim 18 further comprising:

means for setting a method invoker pointer for a method component to point at a method loader routine.

22. The system as recited in claim 21 further comprising:

means for changing the method invoker pointer for the method component to point at a location of an actual method component after the method invoker pointer has been moved to the runtime domain.

\* \* \* \* \*